United States Patent [19]

Chitavat

[11] Patent Number: 4,798,985
[45] Date of Patent: Jan. 17, 1989

[54] LINEAR MOTOR WITH AIR-LIFT BEARING UNLOADING

[76] Inventor: Anwar Chitavat, P.O. Box 107, Northport, N.Y. 11768

[21] Appl. No.: 15,680

[22] Filed: Feb. 17, 1987

[51] Int. Cl.[4] .............................................. H02K 5/16
[52] U.S. Cl. ...................................... 310/90; 310/12; 318/135
[58] Field of Search ....................... 310/12, 13, 14, 90; 318/135, 687

[56] References Cited

U.S. PATENT DOCUMENTS

| | | | |
|---|---|---|---|
| 3,854,781 | 12/1974 | Bildtsen | 384/102 |
| 3,906,262 | 9/1975 | Shichida et al. | 310/12 |
| 4,394,091 | 7/1983 | Klomp | 384/102 |
| 4,628,238 | 12/1986 | Smulders et al. | 318/135 |
| 4,631,404 | 12/1986 | Burkhardt et al. | 250/237 G |
| 4,652,148 | 3/1987 | Olasz | 384/99 |
| 4,667,139 | 5/1987 | Hirai et al. | 318/135 |
| 4,701,651 | 10/1987 | Tanaka | 310/90 |

FOREIGN PATENT DOCUMENTS

0053427 4/1980 Japan .................................. 318/135

Primary Examiner—Patrick R. Salce
Assistant Examiner—Judson H. Jones
Attorney, Agent, or Firm—Thomas R. Morrison

[57] ABSTRACT

A permanent magnet linear motor, optionally built into a bed of a machine tool, employs a combination of bearings and air load-relief pads to support static and dynamic loads. A static preload, exerted by magnetic attraction between permanent magnets and magnetic iron in the armature of the linear motor, provides a static preload to the combination of bearings and air load-relief pads. Air pressure to the air load-relief pad is controlled to a value less than that capable of supporting the entire load applied thereto whereby a reduced, but non-zero, load is carried by the bearings. A dynamic system employs measurement and/or prediction of the bearing loads to modulate air pressures applied to related air load-relief pads, whereby the components of total load supported by the bearings is maintained substantially constant. In one embodiment of the invention, an air bearing is formed between facing surfaces of the motor armature and its plurality of permanent magnets, without using auxiliary contact bearings. In a further embodiment, one or both of the movable and stationary elements of the linear motor are flat plates.

23 Claims, 5 Drawing Sheets

LINEAR MOTOR WITH AIR-LIFT BEARING UNLOADING

BACKGROUND OF THE INVENTION

The present invention relates to electric motors and, more particularly, to linear electric motors.

Many processes require displacing a load along a linear axis to perform a desired function. Typical conventional electric motors employ a rotor driven in rotation about an axis by interacting magnetic fields. As a consequence, means are required to convert the rotational torque of the motor into a linear force. Such conversion means include, for example, ball and screw, and rack and pinion. The conversion means, besides contributing to mechanical inefficiency, adds inertia and backlash (or windup) to the apparatus.

In high-precision linear positioning devices such as, for example, positioning tables of a type disclosed in my U.S. Pat. No. 4,013,280, I discovered that windup of a conventional ball-screw drive interfered with attaining high levels of precision. In addition, the inertia added to the system by the presence of the ball-screw drive reduced the acceleration available to drive the table to high linear rates.

One solution to the backlash or windup problem of a conventional ball-screw drive is disclosed in my U.S. Pat. No. 4,378,709, wherein a conventional ball-screw drive is replaced with a bar affixed to a positioning table and clamped between a drive roller and one or more backup rollers. A drive motor, directly driving the drive roller, moves the bar with the affixed positioning table without backlash from intervening elements.

While the last-referenced patent is effective for reducing windup, it is only partly effective for reducing inertia. The bar, motor, drive roller and backup rollers, although potentially less massive than the elements of a ball-screw drive, nevertheless add mass to the system which must be driven along with the positioning table.

Numerous linear motors are disclosed in the prior art for direct linear drive. These include induction, variable reluctance, and stepper motors. For high-precision positioning tables, I discovered that a permanent-magnet, DC linear motor was highly desirable. Such a device, disclosed in my U.S. Pat. No. 4,560,911, employs a linear armature having a stationary toothed structure containing a plurality of armature coils and a movable structure containing a plurality of permanent magnets facing the armature. Commutator brushes, affixed to the movable structure, contact a stationary commutator to apply properly phased power to the armature coils. In one embodiment of that invention, a pair of stationary power pickup rails are disposed parallel to the commutator and a pair of power pickup brushes are affixed to the movable structure for obtaining the energizing electricity. Alternatively, the electricity may be supplied by pendant cable without requiring power pickup rails and brushes.

The practical development of the above permanent magnet DC linear motor was aided by the availability of high-strength permanent magnets made of, for example, samarium cobalt. Such permanent magnets are light in weight and have extremely high magnetic field strengths. These properties are ideal for positioning light loads at high accelerations, as desired in high-precision positioning tables.

I have discovered that advantage can be taken of the high magnetic field strength of available permanent magnets to increase the linear force available from permanent magnet DC linear motors beyond the few pounds required by a high-precision positioning table. As is well known, the force developed by the interaction of an electric current and a magnetic field is proportional to the product of the armature current and the magnetic field strength. High forces thus require high armature current. Resistive losses in the windings raise the temperature in the armature. The temperature rise must be limited to a value below which heat damage to armature insulation can occur.

The armature of a linear motor is a natural heat sink. The large stationary mass of magnetic iron about which the armature coils are wound is capable of absorbing substantial heat while maintaining a reasonable temperature. In my above-referenced linear motor, the armature is relatively long compared to the length of the movable element. The commutating scheme energizes only those armature coils within the magnetic influence of the permanent magnets in the movable element. An application of such a linear motor which positions the movable element in generally random locations along the armature tends to distribute the heat along the armature. This makes available the relatively large structure of the armature for discharging the heat.

Some applications prevent random deposit of heat along an armature. For example, the high current experienced in accelerating a linear motor may often occur over a small portion of the length of the armature. Thus, even though the magnetic iron in the armature is available as a heat sink, the heat is concentrated in a small portion of the iron, giving rise to unacceptable temperature rise in that portion.

In my U.S. Pat. application Ser. No: 638,488, now U.S. Pat. No. 4,625,132, I disclose a linear motor with a U-shaped frame having a flexible seal closing the arms of the U shape. The movable element within the U-shaped frame is connected to a load through a plate passing through the flexible seal. A coolant fluid such as, for example, air, is injected into one or both ends of the U-shaped frame at a positive pressure with respect to the ambient gas pressure. The coolant fluid flows toward the portion of the armature having coils energized for interaction with the permanent magnets of the movable element. The flexible seal keeps the coolant fluid within the U-shaped frame and at least partly seals the plate. Controlled coolant leakage about the plate permits discharge of the heat from the U-shaped frame in the vicinity of the energized armature coils, which is, of course, precisely where the coolant is most desired.

A linear motor with seal, as disclosed above, has the further advantage in a dirty factory environment of preventing the entry of dirt into the U-shaped frame. Even in the absence of a positive pressure of coolant, the seal excludes dirt. With a positive coolant pressure, even greater cleanliness can be maintained within the linear motor.

For the generation of even greater force, I have discovered that even a moderate flow of a liquid coolant in thermal contact with the armature is capable of maintaining an armature temperature rise within acceptable limits. One embodiment of a linear motor with liquid coolant flow in its armature is disclosed in U.S. patent application Ser. No. 859,915 now abandoned.

The combination of high-magnetic-field-strength permanent magnets with the new ability to cool the armatures of permanent magnet DC linear motors now permits the design of linear motors capable of sufficient force to enter applications never before contemplated for such devices.

Modern permanent magnets facing an armature containing magnetic material exert a high attractive force therebetween. Such high attractive force must be resisted by the structure supporting the movable element. In the case of the above-referenced positioning table, the bearings supporting the table slide for linear motion along its axis are also employed for supporting a movable element affixed thereto. In my U.S. Pat. No. 4,505,464, I disclose a positioning table in which the magnetic attraction of a permanent magnet linear motor is employed for pre-loading the bearings thereof. Thus, rather than being a problem, the magnetic attraction in a permanent magnet linear motor becomes an advantage.

An alternative approach for dealing with the bearing loading imposed by magnetic attraction in a linear motor is disclosed in my U.S. Pat. No. 4,595,870, in which the magnetic attractive forces exerted in a first direction by a first set of permanent magnets are balanced by equal magnetic attractive forces exerted in the opposite direction by a second set of permanent magnets.

A further alternative approach for dealing with the bearing loading imposed by magnetic attraction is disclosed in my U.S. patent application Ser. No. 887,383, now U.S. Pat. No. 4,749,921, where in the armature is formed of non-magnetic material. Thus, the static magnetic attractive forces in conventional permanent magnet linear motors are eliminated.

OBJECTS AND SUMMARY OF THE INVENTION

Accordingly, it is an object of the invention to provide a permanent magnet linear motor which overcomes the drawbacks of the prior art.

It is a further object of the invention to provide a permanent magnet linear motor employing magnetic bearing preloading.

It is a still further object of the invention to provide a permanent magnet linear motor including bearing load relief.

It is a still further object of the invention to provide a permanent magnet linear motor including dynamic bearing load relief variable in response to forces imposed thereon.

It is a still further object of the invention to provide a machine tool having an integral permanent magnet linear motor.

Briefly stated, the present invention provides a permanent magnet linear motor, optionally built into a bed of a machine tool, employing a combination of bearings and air load-relief pads to support static and dynamic loads. A static preload, exerted by magnetic attraction between permanent magnets and magnetic iron in the armature of the linear motor, provides a static preload to the combination of bearings and air load-relief pads. Air pressure to the air load-relief pad is controlled to a value less than that capable of supporting the entire load applied thereto whereby a reduced, but non-zero, load is carried by the bearings. A dynamic system employs measurement and/or prediction of the bearing loads to modulate air pressures applied to related air load-relief pads, whereby the components of total load supported by the bearings is maintained substantially constant. In one embodiment of the invention, an air bearing is formed between facing surfaces of the motor armature and its plurality of permanent magnets, without using auxiliary contact bearings. In a further embodiment, one or both of the movable and stationary elements of the linear motor are flat plates.

According to an embodiment of the invention, there is provided a positioning device comprising: a stationary portion, a movable portion, one of the stationary portion and the movable portion including a plurality of permanent magnets affixed upon a surface thereof, the other of the stationary portion and the movable portion including an armature affixed facing the plurality of permanent magnets, the armature including a plurality of armature coils, the armature further including a mass of magnetically attractive material, whereby a static attractive force exists between at least some of the plurality of permanent magnets and the mass of magnetically attractive material, at least first and second cooperating bearing means for supporting the movable portion against the static attractive force, the first bearing means being a contact-type bearing means, and the second bearing means being of a type having a fluid forced between facing surfaces for supporting a first portion, but less than all, of the static attractive force, whereby the second bearing means is effective for supporting a remainder, less than all of the static attractive force.

According to a feature of the invention, there is provided a positioning device comprising: a stationary portion, a movable portion, one of the stationary portion and the movable portion including a plurality of permanent magnets affixed upon a surface thereof, the other of the stationary portion and the movable portion including an armature affixed facing the plurality of permanent magnets, the armature including a plurality of armature coils, the armature further including a mass of magnetically attractive material, whereby a static attractive force exists between at least some of the plurality of permanent magnets and the mass of magnetically attractive material, means for affixing a load to the movable portion, at least first and second spaced-apart bearing means for supporting the movable portion against the static attractive force and the load, the first and second spaced-apart bearing means bearing first and second load portions, respectively, made up of the magnetic attractive force and the load, the first bearing means including a first fluid-type bearing and a first contact-type bearing means, the first fluid-type bearing including first means for supporting a first portion, but less than all, of the first load portion, the first contact-type bearing supporting a first remainder, but less than all of the first load portion, the second bearing means including a second fluid-type bearing and a second contact-type bearing means, the second fluid-type bearing including second means for supporting a second portion, but less than all, of the second load portion, and the second contact-type bearing supporting a second remainder, but less than all of the second load portion.

According to a further feature of the invention, there is provided a machine tool comprising: a bed of the machine tool, a slot in the bed, a stationary portion affixed in the slot, a movable portion in the slot, means extending from the slot for connecting the movable portion to a load external to the slot, one of the stationary portion and the movable portion including a plurality of permanent magnets affixed upon a surface thereof, the other of the stationary portion and the movable portion including an armature affixed facing the plurality of permanent magnets, the armature including a plurality of armature coils, the armature further including a mass of magnetically attractive material, whereby a static attractive force exists between at least some of the plurality of permanent magnets and the mass of magnetically attractive material, at least first and second spaced-apart bearing means for supporting the movable portion against the static attractive force and the load, the first and second spaced-apart bearing means bearing first and second load portions, respectively, made up of the magnetic attractive force and the load, the first bearing means including a first fluid-type bearing and a first contact-type bearing means, the first fluid-type bearing including first means for supporting a first portion, but less than all, of the first load portion, the first contact-type bearing supporting a first remainder, but less than all of the first load portion, the second bearing means including a second fluid-type bearing and a second contact-type bearing means, the second fluid-type bearing including second means for supporting a second portion, but less than all, of the second load portion, the second contact-type bearing supporting a second remainder, but less than all of the second load portion, the first means for supporting includes a first pressure-control device for controlling the first portion of the first load portion, the second means for supporting includes a second pressure-control device for controlling the second portion of the second load portion, means for determining the first and second remainders, and means for controlling independently the first and second pressure-control devices to maintain the first and second remainders substantially constant.

According to a still further embodiment of the invention, there is provided a linear motor comprising: a stationary portion, a movable portion, one of the stationary portion and the movable portion including a plurality of permanent magnets affixed upon a surface thereof, the other of the stationary portion and the movable portion including an armature affixed facing the plurality of permanent magnets, the armature including a plurality of armature coils, the armature further including a mass of magnetically attractive material, whereby a static attractive force exists between at least some of the plurality of permanent magnets and the mass of magnetically attractive material, means for forcing a flow of a fluid between facing surfaces of the stationary and movable portions whereby an air bearing is formed therebetween, and means on the facing surfaces for producing a flatness sufficient to permit the air bearing to function.

According to a still further embodiment of the invention, there is provided a linear motor comprising: a movable portion, a stationary portion, the movable portion including one of an armature or a plurality of permanent magnets affixed to a first surface thereof facing the stationary portion, the stationary portion including the other of the armature or a plurality of permanent magnets affixed to a second surface thereof facing the movable portion, the movable portion being a generally flat plate, at least first and second generally parallel slide blocks on the first surface, and first and second linear support means on the stationary portion contacting the at least first and second slide blocks and supporting at least some of a load.

DETAILED DESCRIPTION OF THE PREFERRED EMBODIMENT

Figure 1:
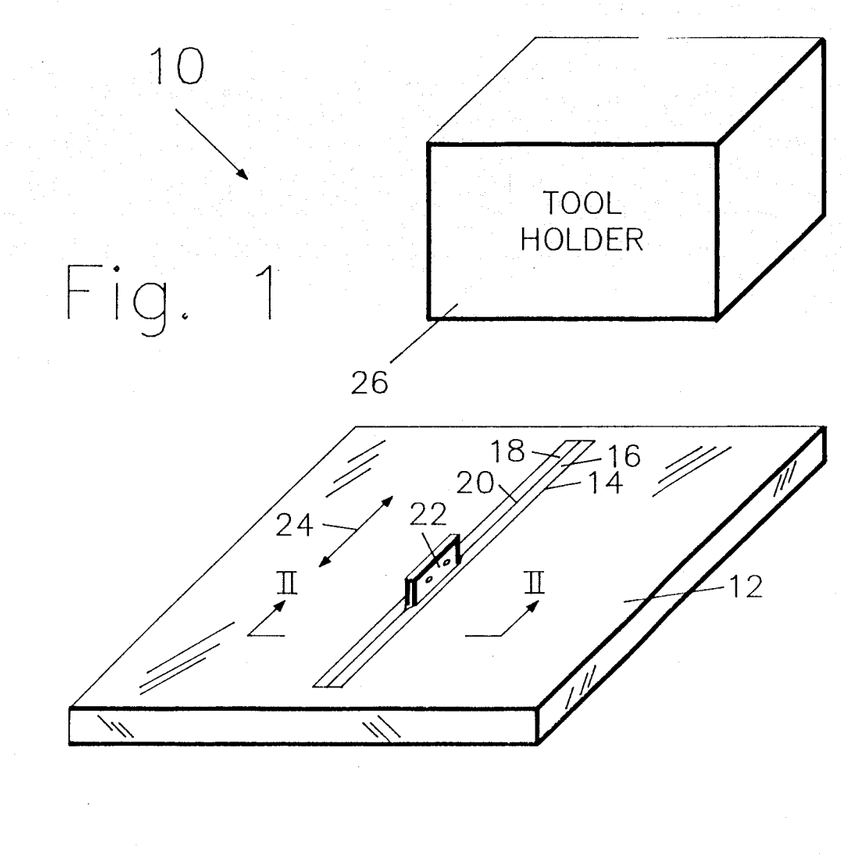
FIG. 1 is a perspective view of a machine tool including an embodiment of the invention.

Referring now to FIG. 1, there is shown, generally at 10, a machine tool containing an embodiment of the invention. It should be understood that the overall combination of elements in machine tool 10, although representing one embodiment of the invention, should not be considered to be limiting. Embodiments in environments other than machine tools should be considered to lie within the spirit and scope of the present invention.

A machine bed 12 includes a slot 14 therein optionally sealed by first and second flexible seals 16 and 18 meeting at a line of sealing contact 20. A load plate or load bar 22 extends upward through slot 14 with flexible seals 16 and 18 deforming to permit passage therebetween while maintaining a seal with exterior surfaces thereof. A workpiece such as, for example, a block of metal (not shown) to be machined, may be affixed to load bar 22 by any conventional means for displacement along a linear axis as indicated by a double-headed arrow 24.

A conventional tool holder 26 is disposed in a desired relationship to machine bed 12 by a conventional machine frame (not shown). As is conventional, tool holder 26 may include provision for tool advance (motion toward machine bed 12) as well as tool traverse (motion parallel to the top surface of machine bed 12 and preferably normal to double-headed arrow 24). Since apparatus for holding and controlling motion of tools is conventional, and well known to those skilled in the art, it is considered redundant to provide more detail than the box illustration shown.

Figure 2:
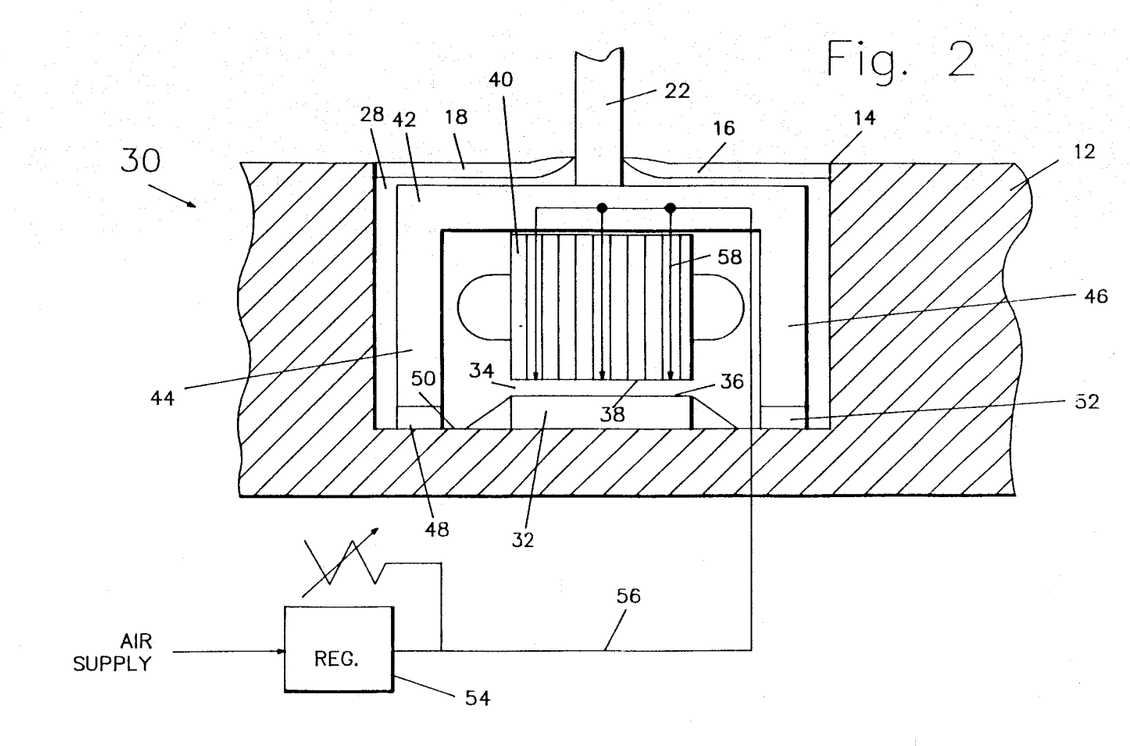
FIG. 2 is a cross section taken along II—II in FIG. 1.

Referring now to FIG. 2, a cavity 28 in machine bed 12 includes a linear motor, shown generally at 30. A plurality of permanent magnets 32 are disposed along substantially the entire length of cavity 28. An encapsulating coating 34 includes a flat upper surface 36 facing a flat lower surface 38 of an armature 40. Suitable flatness and parallelism between flat upper surface 36 and flat lower surface 38 may be attained by grinding. A bridge beam 42 affixed to armature 40 includes first and second pendant legs 44 and 46. A conventional bearing 48 supports a lower end of pendant leg 44 above a bottom surface 50 of cavity 28. Similarly, a bearing 52 supports a lower end of pendant leg 46 above bottom surface 50.

An air-pressure regulator 54 provides a pressure-regulated supply of compressed air on a regulated supply line 56 to a plurality of air channels 58 passing through armature 40 and terminating in a gap 60 between encapsulating coating 34 and flat upper surface 36. The air flow into gap 60, determined by the regulated air pressure, produces the equivalent of an air bearing, exerting an upward force and tending to raise armature 40, together with its attached elements. A magnetic attractive force between permanent magnets 32 and magnetic iron in bearing 48 applies a downward force opposing the upward force in gap 60.

In the preferred embodiment, bearings 48 and 52 are contacting devices such as, for example, ball or roller bearings or slide blocks providing rigid support for pendant legs 44 and 46. The lifting force provided by the air flow into gap 60 is controlled to a value smaller than the magnetic attractive force acting in the opposite direction, whereby at least some of the magnetic attractive force, as well as other downward forces applied through load bar 22, is supported by bearings 48 and 52.

The above-described apparatus solves two problems in linear motor systems: (1) oscillation or flutter from variation in the air-bearing gap, and (2) rapid bearing wear due to high bearing loading resulting from magnetic attractive forces.

The first problem arises in air bearings wherein the thickness of the air gap changes with applied load. Such change, in turn, changes the position of the load with respect to the substrate, resulting in positioning errors. Since the air support in the present invention is controlled to a value less than the magnetic attractive force, bridge beam 42 and armature 40 are rigidly supported on contact-type bearings 48 and 52. Thus, gap 60 remains at a constant value incapable of substantial variation. Thus, a given value of air pressure from air-pressure regulator 54 tends to provide a constant value of lift, regardless of the magnitude of the sum of opposing forces from magnetic attraction and load.

Figure 3:
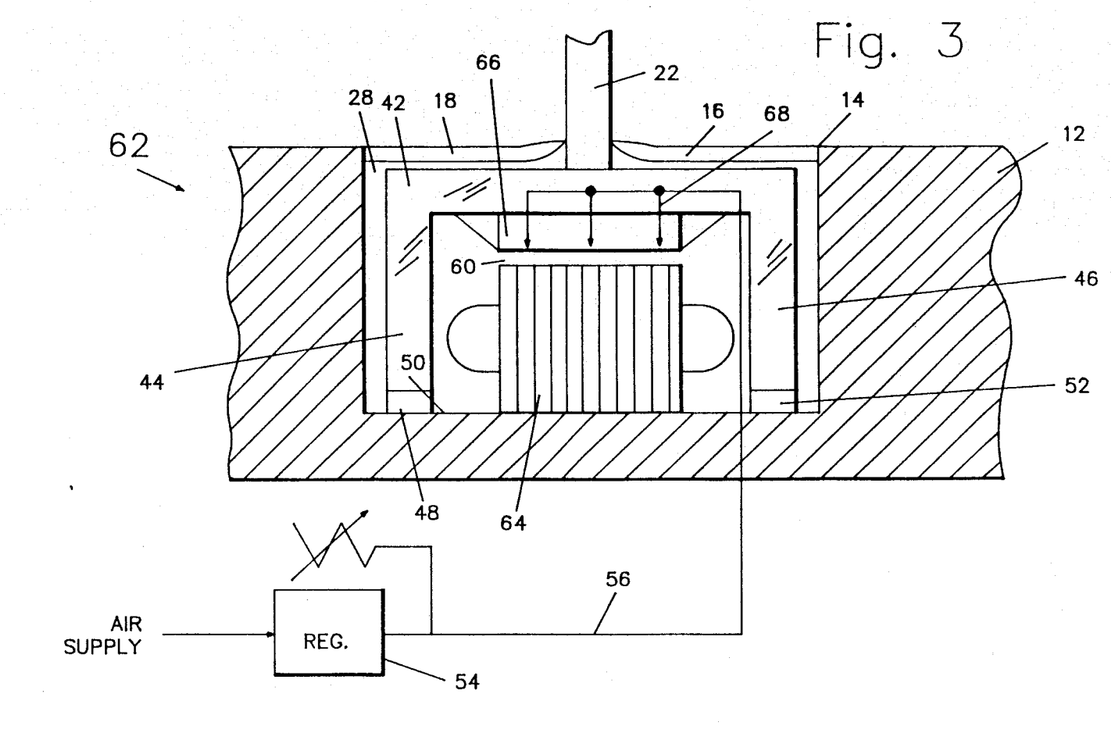
FIG. 3 is an embodiment of the invention taken along a cross section corresponding to FIG. 2 but with the positions of the armature and permanent magnets reversed.

In the embodiment of FIG. 2, it is assumed that the length of armature 40 normal to the plane of the page is small compared to the length of the plurality of permanent magnets 32 disposed on bottom surface 50. Such is not the only arrangement foreseen for the present invention. As shown in FIG. 3, a corresponding linear motor 62 includes an armature 64 affixed to bottom surface 50 of cavity 28 and a plurality of permanent magnets 66 affixed to bridge beam 42. A regulated air supply is connected on a regulated supply line 56 to a plurality of air channels 68 exiting into gap 60. Although air channels 68 appear to be passing through permanent magnets 66, they pass between adjacent permanent magnets 66 to exit into gap 60. In the embodiment of FIG. 3, armature 64 has a length which is large compared to the length of the plurality of permanent magnets 66.

Although it should not be deemed to be limiting, a numeric example of the forces acting on bridge beam 42 may be instructive. The combined static magnetic attractive forces exerted by permanent magnets 66 (or permanent magnet 32) on armature 64 (or armature 40) may be, for example, about 4000 pounds. The bearing-relief force produced by the air injected into gap 60 may be, for example, about 3900 pounds. Thus, bearings 48 and 52 are required to support a total of only about 100 pounds. Since bearing wear generally bears an exponential relationship to load, such a dramatic load reduction is accompanied by an even more dramatic improvement in bearing life. Such improved bearing life is accomplished without the drawbacks flowing from conventional use of air bearings. That is, the variability of air gap with load and the resulting tendency toward load positional oscillation or vibration.

It will be realized that means must be provided for resisting forces transverse to the direction of travel. Such means may be the same as, or different from, the apparatus described in the foregoing.

The support provided by bearings 48 and 52 may be optionally omitted whereby all load support is provided by the air bearing formed by the gap between the facing surfaces of flat upper surface 36 and flat lower surface 38. In one embodiment, bearings 48 and 52 are provided for supporting static loads while the apparatus is turned off in order to avoid direct contact between flat upper surface 36 and flat lower surface 38. As soon as a full supply of air is available, armature 40 (or permanent magnet 66 of FIG. 3) is raised whereby the contact previously existing with bearings 48 and 52 is released. Although this arrangement loses the benefit of eliminating the variable air gap, it offers an air bearing fully integrated into a linear motor.

Figure 4:
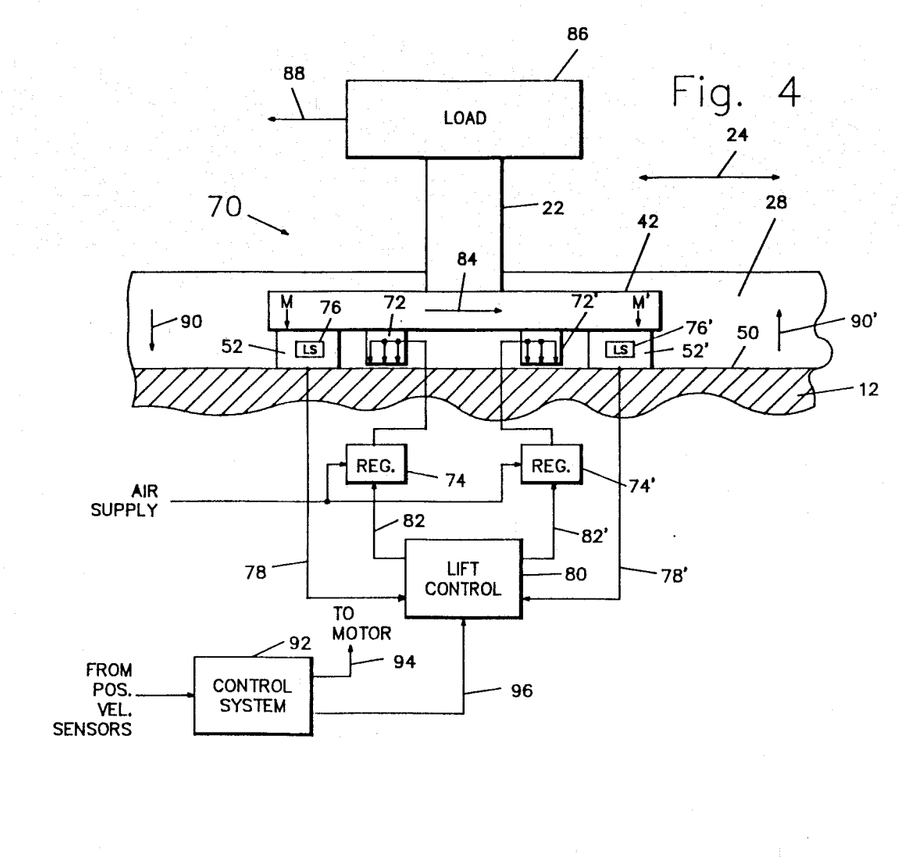
FIG. 4 is a simplified block and schematic diagram of a dynamic embodiment of the invention.

Referring now to FIG. 4, a dynamic situation is shown of a type commonly encountered in a high-acceleration system. In the side view of a linear motor 70, first and second bearings 52 and 52' are disposed near opposed ends of bridge beam 42. A first air load-relief pad 72 adjacent bearing 52 and a second air load-relief pad 72' adjacent bearing 52' receive independently regulated air supplies from externally controlled pressure regulators 74 and 74', respectively. A load sensor 76 associated with bearing 52 produces a signal related to the load borne by bearing 52, for application on a line 78 to a lift-control circuit 80. Lift-control circuit 80 produces a first lift-control signal for application of a lift-control signal line 82 to externally controlled pressure regulator 74. The lift-control signal applied to externally controlled pressure regulator 74 modulates the air pressure applied to air load-relief pad 72 to values tending to increase and decrease the amount of load-support provided by air load-relief pad 72 to maintain the load borne by bearing 52 at a constant value. Corresponding elements associated with load sensor 76' and air load-relief pad 72' tend to maintain the load borne by bearing 52' at a constant value.

The remainder of the elements making up linear motor 70 correspond to those previously described and disclosed in the referenced prior art. Thus, these elements are omitted from FIG. 4 to reduce clutter and improve understanding of the invention.

In a dynamic situation, linear motor 70 may be commanded to accelerate in a rightward direction indicated by an arrow 84. A load 86 may exert a retarding force in the opposite direction as indicated by an arrow 88. Due to the vertical separation between arrow 84 and arrow 88, an overturning force is applied to bridge beam 42 tending to increase the load supported by bearing 52 (indicated by downward arrow 90) and to reduce the load supported by bearing 52' (indicated by upward arrow 90'). Lift-control circuit 80 responds to such dynamic changes by increasing the air pressure provided by externally controlled pressure regulator 74 and decreasing the air pressure provided by externally controlled pressure regulator 74' to values effective to return the loads supported by bearings 52 and 52' to their original values.

As a non-limiting numerical example, suppose that a static load of 2000 pound is applied to bearing 52 and air load-relief pad 72, with the same static load applied to bearing 52' and air load-relief pad 72'. Air pressure to air load-relief pads 72 and 72' is controlled to support 1900 pounds. Thus, each of bearings 52 and 52' supports only 100 pounds. Now suppose that a combination of an acceleration command arrow 84 and load resistance arrow 88 increases the load on the combination of bearing 52 and air load-relief pad 72 by 200 pounds and reduces the load on the combination of bearing 52' and air load-relief pad 72' by the same amount. Without means to prevent it, the reduced load on load sensor 76' would permit the air gap between air load-relief pad 72' and bottom surface 50 to increase whereby bearing 52' would rise out of contact with bottom surface 50. If this were permitted to occur, the problems inherent in air bearings would be invoked.

Instead, lift-control circuit 80 modulates the air pressures regulated by externally controlled pressure regulators 74 and 74' to increase the amount of lift produced by air load-relief pad 72 and reduce the amount of lift produced by air load-relief pad 72' by 100 pounds, whereby each of load sensors 76 and 76' continues to support just 100 pounds.

Upon contemplation, it will be realized that the greater the static magnetic attraction provided, the greater the amount of overturning moment can be accommodated by the system illustrated in FIG. 4. That is, if the design load to be borne by bearing 52' is 100 pounds and the static magnetic attraction applies a static force of 2000 pounds to the combination of bearing 52' and air load-relief pad 72', an upward overturning force of 1900 pounds can be accommodated (at zero lift exerted by air load-relief pad 72') before the load borne by bearing 52' must decrease. It is assumed that a similar 1900-pound downward overturning force exerted on the combination of bearing 52 and air load-relief pad 72, in addition to the static 2000-pound static load can be accommodated by increasing the air pressure delivered to air load-relief pad 72 by an amount capable of supporting 3900 pounds, thereby maintaining the load borne by load sensor 76 unchanged at 100 pounds.

The foregoing description relates to compensation for dynamic loading in the direction of motion of linear motor 70 as indicated by double-headed arrow 24. It would be clear to one skilled in the art that the illustrated apparatus may be duplicated for compensating for dynamic loading transverse to double-headed arrow 24.

A conventional control system 92 provides control signals on a line 94 effective for driving linear motor 70 in a direction, and at an acceleration determined by manual or automatic inputs (not shown). Such control signals may be further interpreted to predict at least part of the magnitudes of overturning moments (arrows 90 and 90') produced by such control signals. For example, a priori knowledge of the mass of load 86, the vertical separation between the center of mass of load 86 and arrow 84, and the magnitude of the acceleration inherent in the control signal, provides sufficient information to predict the amount of increase and reduction in air lift likely to be experienced as a result of the control signal. A predictive signal, related to this information, may be applied from control system 92 on a line 96 to lift-control circuit 80. In response to the predictive signal, lift-control circuit 80 may anticipate changes in load signals produced by load sensors 76 and 76' whereby a speed for accommodating measured changes in load may be improved.

Figure 5:
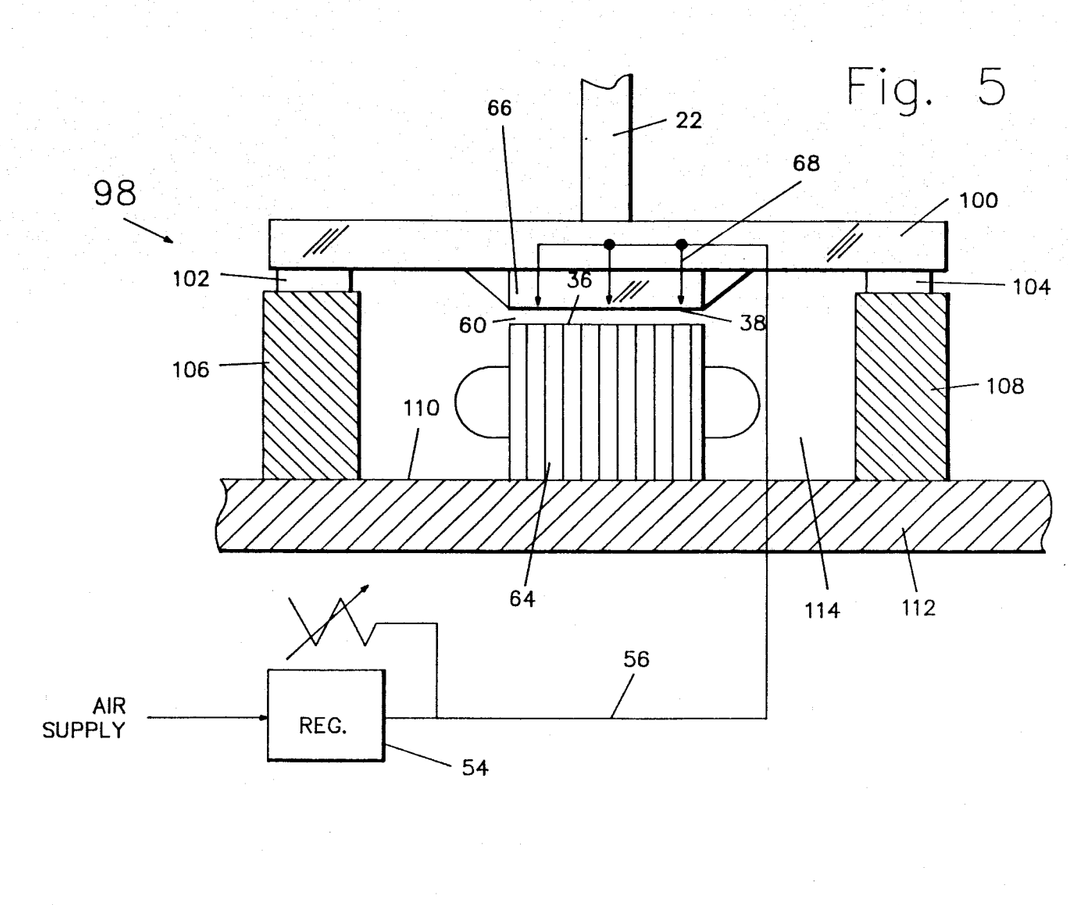
FIG. 5 is a cross section of a further embodiment of the invention.

Referring now to FIG. 5, a linear motor 98 is shown according to a further embodiment of the invention. A flat plate 100 serves as the movable element of linear motor 98, with first and second slide blocks 102 and 104 along opposed edges thereof. First and second support rail 106 and 108 are affixed to an upper surface 110 of a bed 112. A cavity 114, formed between support rails 106 and 108 provides clearance for armature 64 disposed on upper surface 110 with its flat upper surface 36 facing flat lower surface 38 of permanent magnet 66. As in prior embodiments flat upper surface 36 and flat lower surface 38 are formed with accurate flatness by, for example, grinding. As also in prior embodiments, lateral guidance means (not shown) are assumed to be present. Motion of flat plate 100 is in and out of the plane of the page.

The embodiment of FIG. 5 has the advantage of simplicity in that flat plate 100 is essentially a flat plate with slide blocks 102 and 104 attached. In addition, bed 112 may also be a flat plate with support rails 106 and 108 affixed thereto.

Any suitable materials may be used in linear motor 98. It is preferred that flat plate 100 be of a magnetic material in order to provide return magnetic paths for the plurality permanent magnets 66 affixed thereto. Slide blocks 102 and 104 are preferably of a slippery plastic having suitable wear-resistant properties such as, for example, Teflon. Support rails 106 and 108 are preferably of a hard metallic material such as, for example, steel. Upper surfaces of support rails 106 and 108 are preferably ground and polished for reduced friction and wear.

Instead of using support rails 106 and 108 to create cavity 114, a suitable cavity may be formed in bed 112 as exemplified in the prior embodiments.

It is worth noting that the simplified construction of the embodiment of the invention in FIG. 5 may be valuable whether or not air lift is provided for reducing the force on slide blocks 102 and 104. Such an embodiment should be considered to be within the scope and spirit of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A positioning device comprising:
   a stationary portion.
   a movable portion;
   one of said stationary portion and said movable portion including a plurality of permanent magnets affixed upon a surface thereof;
   the other of said stationary portion and said movable portion including an armature affixed facing said plurality of permanent magnets;
   said armature including a plurality of armature coils;
   said armature further including a mass of magnetically attractive material, whereby a static attractive force exists between at least some of said plurality of permanent magnets and said mass of magnetically attractive material;
   at least first and second cooperating bearing means for supporting said movable portion against said static attractive force;
   said first cooperating bearing means being a contact-type bearing means; and
   said second cooperating bearing means being of a type having a fluid forced between facing surfaces for supporting a first portion, but less than all, of said static attractive force, whereby said second cooperating bearing means is effective for supporting a remainder, less than all, of said static attractive force at all times during operation of said positioning device.

2. A positioning device according to claim 1 wherein said second cooperating bearing means is an air bearing.

3. A positioning device according to claim 2 wherein said second cooperating bearing means includes means for controlling a magnitude of said first portion.

4. A positioning device according to claim 3 wherein said means for controlling a magnitude includes an air pressure regulator effective for controlling a pressure of air forced between said facing surfaces.

5. A positioning device comprising:
   a stationary portion;
   a movable portion;
   one of said stationary portion and said movable portion including a plurality of permanent magnets affixed upon a surface thereof;
   the other of said stationary portion and said movable portion including an armature affixed facing said plurality of permanent magnets;
   said armature including a plurality of armature coil
   means for applying a static load to said movable portion;
   at least first and second cooperating bearing means for supporting said movable aportion against said static load;
   said first cooperating bearing means being a contact-type bearing means;
   said second cooperating bearing means being of a type having a fluid forced between facing surfaces for supporting a portion, but less than all, of said static load, whereby said second cooperating bearing means is effective for supporting a remainder, less than all, of said static load;
   said first and second cooperating bearing means being further effective for supporting a load added to said static load;
   means for determining a magnitude of a remainder of said load and said static load borne by said first cooperating bearing means; and
   means for controlling a flow of said fluid forced between said facing surfaces to a value effective for maintaining said remainder substantially constant under changes in said load.

6. A positioning device according to claim 5 wherein said means for determining includes means for measuring said remainder.

7. A positioning device according to claim 6 wherein said means for measuring includes a load cell.

8. A positioning device according to claim 6 wherein said means for controlling a pressure of air includes a lift control responsive at least to a measurement of said remainder.

9. A positioning device according to claim 5 wherein said means for determining includes means for predicting said remainder.

10. A positioning device according to claim 1 wherein said stationary portion is affixed to a machine bed.

11. A positioning device according to claim 1 wherein:
   said stationary portion is affixed in a slot in a bed of a machine; and
   said movable portion is disposed in said slot facing said stationary portion.

12. A positioning device according to claim 11 wherein said movable portion is connected to a load by a load bar extending from said slot.

13. A positioning device according to claim 12, further comprising at least one means for sealing said slot against entry of dirt into said slot whereby said positioning device operates in a clean environment.

14. A positioning device according to claim 13 wherein said at least one sealing means includes:
   a first flexible seal affixed along a first edge of said slot;
   a second flexible seal affixed along a second edge of said slot and forming a line of sealing contact with said first flexible seal;
   said load bar deforming at least one of said first and second flexible seals for passing therepast; and
   at least one of said first and second flexible seals forming a sealing contact with said load bar.

15. A positioning device according to claim 1 wherein said first cooperating bearing means includes a sliding bearing.

16. A positioning device according to claim 1 wherein said first cooperating bearing means includes a rolling bearing.

17. A positioning device comprising:
   a stationary portion;
   a movable portion;
   one of said stationary portion and said movable portion including a plurality of permanent magnets affixed upon a surface thereof;
   the other of said stationary portion and said movable portion including an armature affixed facing said plurality of permanent magnets;
   said armature including a plurality of armature coils;
   said armature further including a mass of magnetically attractive material, whereby a static attractive force exists between at least some of said plurality of permanent magnets and said mass of magnetically attractive material;
   means for affixing a load to said movable portion;
   at least spaced-apart first and second bearing means for supporting said movable portion against said static attractive force and said load;
   said first and second spaced-apart bearing means bearing first and second load portions, respectively, made up of said magnetic attractive force and said load;
   said first bearings means including a first fluid-type bearing and a first contact-type bearing;
   said first fluid-type bearing including first means for supporting a first portion, but less than all of said first load portion;
   said first contact-type bearing supporting a first remainder, but less than all, of said first load portion at all times during operation of said positioning device;
   said second bearing means including a second fluid-type bearing and a second contact-type bearing;
   said second fluid-type bearing including second means for supporting a second portion, but less than all, of said second load portion; and
   said second contact-type bearing supporting a second remainder, but less than all, of said second load portion at all times during operation of said positioning device.

18. A positioning device according to claim 17 wherein said first and second means for supporting including at least one pressure regulator for regulating a pressure of said fluid applied between facing surfaces.

19. A positioning device comprising:
   a stationary portion;
   a movable portion;
   one of said stationary portion and said movable portion including a plurality of permanent magnets affixed upon a surface thereof;

the other of said stationary portion and said movable portion including an armature affixed facing said plurality of magnets;

means for applying a static load to said movable portion;

means for affixing a load to said movable portion;

at least spaced-apart first and second bearing means for supporting said movable portion against said static load and said load;

said first and second spaced-apart bearing means bearing first and second load portions, respectively, made up of said static load and said load;

said first bearing means including a first fluid-type bearing and a first contact-type bearing;

said first fluid-type bearing including first means for supporting a first portion, but less than all, of said first load portion;

said first contact-type bearing including means for supporting a first remainder, but less than all of said first load portion;

said second bearing means including a second fluid-type bearing and a second contact-type bearing;

said second fluid-type bearing including second means for supporting a second portion, but less than all of said second load portion;

said second contact-type bearing supporting a second remainder, but less than all of said second load portion;

said first means for supporting includes a first pressure-control device for controlling said first portion of said first load portion;

said second means for supporting includes a second pressure-control device for controlling said second portion of said second load portion;

means for determining said first and second remainders; and means for controlling independently said first and second pressure-control devices to maintain said first and second remainders substantially constant.

20. A machine tool comprising:
a bed;
a slot in said bed;
a stationary portion affixed in said slot;
a movable portion in said slot;
means extending from said slot for connecting said movable portion to a load external to said slot;
one of said stationary portion and said movable portion including a plurality of permanent magnets affixed upon a surface thereof;
the other of said stationary portion and said movable portion including an armature affixed facing said plurality of permanent magnets;

said armature including a plurality of armature coils;

said armature further including a mass of magnetically attractive material, whereby a static attractive force exists between at least some of said plurality of permanent magnets and said mass of magnetically attractive material;

at least first and second spaced-apart bearing means for supporting said movable portion against said static attractive force and said load;

said first and second spaced-apart bearing means bearing first and second load portions, respectively, made up of said magnetic attractive force and said load;

said first bearing means including a first fluid-type bearing and a first contact-type bearing;

said first fluid-type bearing including first means for supporting a first portion, but less than all, of said first load portion;

said first contact-type bearing supporting a first remainder, but less than all, of said first load portion;

said second bearing means including a second fluid-type bearing and a second contact-type bearing;

said second fluid-type bearing including second means for supporting a second portion, but less than all, of said second load portion;

said second contact-type bearing supporting a second remainder, but less than all, of said second load portion;

said first means for supporting includes a first pressure-control device for controlling said first portion of said first load portion;

said second means for supporting includes a second pressure-control device for controlling said second portion of said second load portion;

means for determining said first and second remainders; and means for controlling independently said first and second pressure-control devices to maintain said first and second remainders substantially constant.

21. A machine tool according to claim 20 wherein said means for determining includes at least first and second means for measuring said first and second remainders.

22. A machine tool according to claim 21 wherein said first and second means for measuring includes at least first and second load cells.

23. A machine tool according to claim 20 wherein said means for determining includes means for predicting said first and second remainders.

* * * * *